United States Patent
Larson et al.

(10) Patent No.: US 8,142,657 B2
(45) Date of Patent: *Mar. 27, 2012

(54) INSERTION-POINT SEAL FOR SPIRAL WOUND MODULE

(75) Inventors: Alvin O. Larson, Richfield, MN (US);
Steven D. Jons, Eden Prairie, MN (US);
Pearl I. Moody, Lansing, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,048

(22) Filed: Apr. 4, 2011

(65) Prior Publication Data

US 2011/0174429 A1    Jul. 21, 2011

Related U.S. Application Data

(63) Continuation of application No. 12/095,527, filed as application No. PCT/US2006/046912 on Dec. 6, 2006, now Pat. No. 7,951,295.

(60) Provisional application No. 60/748,142, filed on Dec. 7, 2005.

(51) Int. Cl.
*B01D 63/10* (2006.01)
*B01D 67/00* (2006.01)
*C09J 4/04* (2006.01)

(52) U.S. Cl. ......... 210/321.83; 210/321.85; 210/321.74; 210/321.76; 210/494.1; 156/185; 156/331.1; 156/331.8

(58) Field of Classification Search .................. None
See application file for complete search history.

(56) References Cited

U.S. PATENT DOCUMENTS

| | | | |
|---|---|---|---|
| 4,842,736 | A | 6/1989 | Bray et al. |
| 5,096,584 | A | 3/1992 | Reddy et al. |
| 5,102,552 | A | 4/1992 | Callahan et al. |
| 5,146,531 | A | 9/1992 | Shustack |
| 5,147,541 | A | 9/1992 | McDermott, Jr. et al. |
| 5,232,593 | A | 8/1993 | Pedersen et al. |
| 5,366,625 | A | 11/1994 | Pedersen et al. |
| 5,464,538 | A | 11/1995 | Schmidt et al. |
| 5,538,642 | A | 7/1996 | Solie |
| 5,591,404 | A | 1/1997 | Mathewson |
| 5,681,467 | A | 10/1997 | Solie et al. |
| 5,782,791 | A | 7/1998 | Peterson et al. |
| 6,218,465 | B1 | 4/2001 | Kobayashi et al. |
| 6,274,055 | B1 | 8/2001 | Zuk, Jr. |
| 6,342,122 | B1 | 1/2002 | Riley et al. |
| 6,358,660 | B1 | 3/2002 | Agler et al. |
| 6,423,472 | B1 | 7/2002 | Kumpfmiller et al. |
| 6,433,091 | B1 | 8/2002 | Cheng |
| 6,632,356 | B2 | 10/2003 | Hallan et al. |
| 2001/0042710 | A1 | 11/2001 | Clark et al. |
| 2003/0034293 | A1 | 2/2003 | Simonetti |
| 2004/0099598 | A1 | 5/2004 | Cheng |
| 2005/0121380 | A1 | 6/2005 | De La Cruz |

FOREIGN PATENT DOCUMENTS

| | | |
|---|---|---|
| EP | 0443642 | 1/1991 |
| EP | 0562520 | 3/1993 |
| EP | 1256372 | 5/2002 |
| WO | 0240140 | 5/2002 |
| WO | 2007067751 | 6/2007 |

*Primary Examiner* — Krishnan S Menon
(74) *Attorney, Agent, or Firm* — Edward W. Black

(57) ABSTRACT

An improved method of fabricating a spiral wound module seals a juncture between each scroll face, preferably a smooth, trimmed scroll face, and a central permeate tube. The tube is generally perpendicular to the scroll face. Modules produced using the improved method have fewer insertion point leaks than those produced without using the improved method.

11 Claims, 2 Drawing Sheets

INSERTION-POINT SEAL FOR SPIRAL WOUND MODULE

CROSS REFERENCE STATEMENT

This application is a continuation of U.S. application Ser. No. 12/095,527 which was a 371 application based upon PCT/US06/46912 filed 6 Dec. 2006, which claimed the benefit of U.S. 60/748,142 filed 7 Dec. 2005. The entire contents of all preceding applications are incorporated herein by reference.

BACKGROUND OF THE INVENTION

A spiral wound module is the most common configuration for reverse osmosis and nanofiltration membranes. In operation, "Feed" liquid under pressure enters the module at one end, flows axially through a feed spacer sheet, and exits on the opposite end as "concentrate". "Permeate" solution (commonly water) passes under pressure through the membrane while a solute (often salt) is substantially retained. The spiral wound configuration allows a large amount of membrane area to be packed into a small volume.

One or more membrane envelopes and feed spacer sheets are wrapped about a central permeate collection tube. The envelopes comprise two generally rectangular membrane sheets surrounding a permeate carrier sheet. This "sandwich" structure is held together by an adhesive along three edges of each membrane sheet: the back edge furthest from the permeate tube, and the two side edges that will become the feed (inlet) and concentrate (outlet) ends of the module. Adhesive at the side edges additionally affix and seal membrane sheets to the permeate tube at each end of the module. The fourth edge of the envelope is open and abuts the permeate collection tube so that the permeate carrier sheet is in fluid contact with small holes passing through the permeate collection tube. Construction of spiral wound modules is described further in U.S. Pat. Nos. 5,538,642, 5,681,467, and 6,632,356, which are incorporated by reference.

The time and complexity associated with fabricating a module increases with the number of membrane envelopes used in its construction. Since all envelopes in a module are wound together in the last step of rolling, it is important that adhesive applied to a first leaf is not cured before the last leaf is inserted. Whether rolling manually or using automation, it is further desirable that the time for solidifying adhesive lines is substantially longer than the time minimally required for constructing the module, since this allows for potential upsets or delays in the process that would otherwise scrap a module. As described in U.S. Pat. No. 5,096,584, particularly suitable adhesives for joining membrane leaves are ". . . commercially-available polymeric adhesives, e.g. H.P. Fuller polyurethane or Dow epoxy material (DER) which is cured with a diamine, and sets up as a flexible solid with a variable cure time, typically about 2-24 hours or so."

After adhesive cures, the two opposing ends of the module are optionally trimmed to remove any excess adhesive that might extend beyond the sides of the membrane sheets. The trimming procedure may be performed while rotating the module. Cuts at each end are made from the outer diameter of the module to approximately the outer diameter of the permeate tube. The lines of adhesive running along both side edges of each membrane sheet are typically cross sectioned in the trimming process, but the cuts must not extend into the permeate region. Trimming results in a well-defined module length and a smooth scroll face.

In a defect free module, the membrane barrier layer effectively separates feed solution from permeate liquid. However, there are several regions of a module where feed solution may potentially leak into the permeate flow path. The membrane itself may have localized defects such as scratches and pinholes. Broken or missing adhesive lines running along the back and sides of the permeate carrier sheet can provide a direct path for feed to enter the permeate. At the inlet and outlet ends of the module, within a few millimeters of the permeate tube, voids may exist where adhesive surrounding the tube fails to effectively seal the feed solution from the permeate flow path. Finally, the folded edge abutting the permeate collection tube has been a common source of leaks, particularly for modules subjected to very rigorous and frequent cleaning cycles.

The trimming process has potential to create large leaks in a module that would otherwise be sealed, particularly in the area of adhesive that affixes membrane sheets to the permeate tube. Even when the trimming process appropriately avoids slicing into the permeate region, the act of cross sectioning the adhesive can open otherwise sealed voids and allow for fluid communication between feed and permeate solutions. The original defect may result from a leaf that was improperly inserted or, especially, from a leaf that pulls away from the module during construction and creates a gap within the adhesive. In either case, a gap near the permeate tube that allows feed fluid to pass into the permeate channel is referred to here as an "insertion-point leak."

A typical spiral wound module for seawater desalination will pass less than 0.3% NaCl when tested at standard conditions (800 psi, 32000 ppm NaCl feed). A single insertion-point leak can ruin a reverse osmosis module. A one inch long hole of only 0.5 mm in diameter can pass enough feed solution into the permeate region to cause more than 5% salt passage during a standard test.

As illustrated in FIG. 1, some high rejection modules at FilmTec (SW-380-HR) have been further modified by application of a protective bead of sealant to the trimmed ends of a module at the intersection of the permeate tube and scroll face, so that the bead surrounds the permeate tube and reduces the potential for a leak in this area. A sealing bead consisting of a two-part urethane, of the same type used for adhering the three edges of membrane envelopes in the module, has been applied at the intersection of the permeate tube and scroll face for this purpose. Alternatively, a bead of hot melt has been applied in this manner.

In laboratory experiments with simulated leaks, we have found that sealants capable of forming covalent bounds after application were more effective than the hot melt in providing a robust seal. However, use of such reactive adhesives for this purpose introduces several practical issues. Application and curing of an adhesive bead applied about the permeate tube is an additional step after forming a module that further increases production time, so that long cure times, as are typically needed and used in module construction, are undesirable in this process. Long cure times are also undesirable because low viscosity materials, that can best enter and seal small voids, have potential to run under gravity over time. At the other extreme, application of small amounts of reactive materials with very short cure times can be very difficult to implement in an automated, high volume, environment, as small upsets to the process provide the likelihood that polymerization within the applicator could cause substantial downtime.

A sealant material is desired that may be applied as a liquid to the scroll ends of spiral wound modules, in the vicinity of the permeate tube, and that may be rapidly cured by reaction to form covalent bonds and prevent insertion-point leaks. It is further desired that the rate of reaction for the sealant is made to increase after it is applied to the spiral wound module, so that its rate of reaction while in contact with the module is at least twice that of its rate of reaction prior to contact with the module. It is desire that this reactive sealant achieves a stable form in less than 15 minutes. Most preferably, the reactive sealant is made stable in less than 5 minutes or even less than 1 minute.

DETAILED DESCRIPTION OF INVENTION

Figure 1:
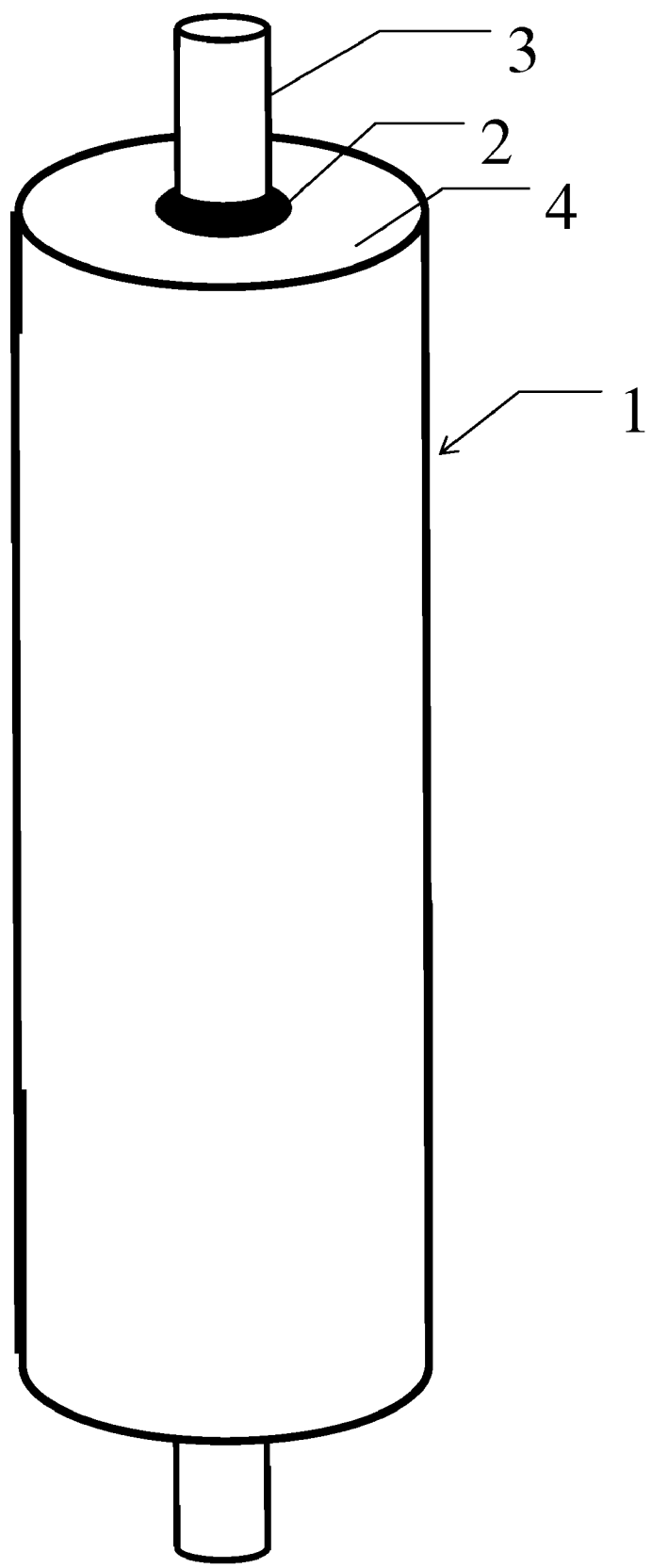
FIG. 1 is a perspective view of a spiral wound module including an insertion-point seal.
Figure 2:
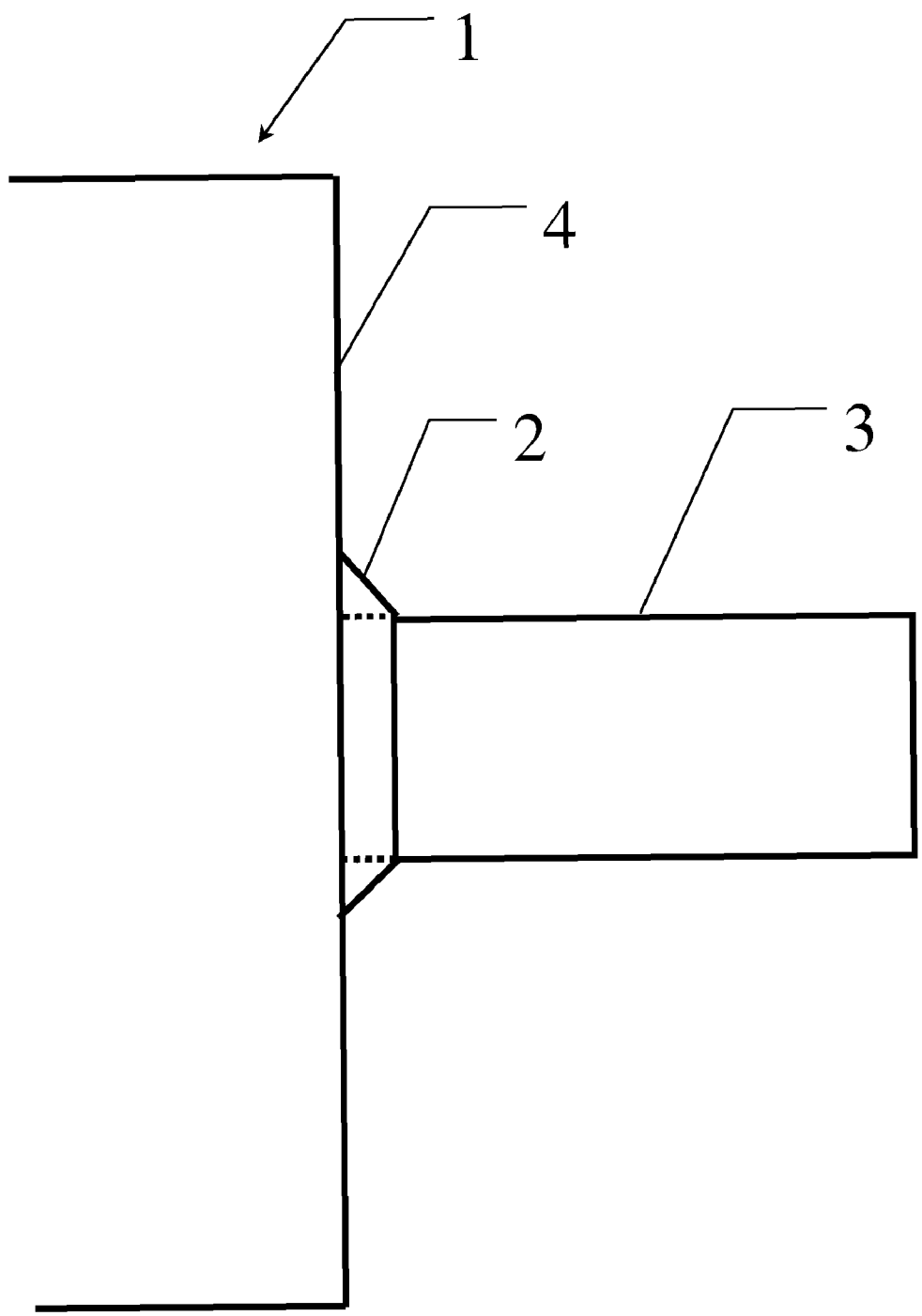
FIG. 2 is a partially cut-away elevation view of the module of FIG. 1.

This invention provides an improved means for eliminating potential insertion-point leaks within a trimmed spiral wound module (1). A bead of sealant material (2) is made to encircle the permeate tube, contacting both the permeate tube (3) and scroll face (4). This is shown in FIGS. 1 and 2. In particular, the sealant material of this invention is reactive and also chemically distinct from the adhesive that affixes membrane sheets within the module. This difference may be in either the composition or the concentration of components (e.g. monomers, catalysts, initiators), but the difference results in a shorter cure time for the sealant material applied around the potential insertion-point leak. In particular, it is desired that the time for the sealant material to achieve a viscosity of 200,000 centipoise is less than 10 minutes, more preferably less than 5 minutes, and most preferably less than 1 minute, whereas the time for adhesive used to join membrane sheets to achieve a viscosity of 200,000 centipoise is at least 20 minutes.

A very short time, on the order of seconds, is actually required to lay down a bead of material about the scroll region surrounding the permeate tube. We have found that long cure time materials, such as used in construction of modules to join membrane sheets, are not desirable for capping potential insertion-point leaks. In constructing modules, a long cure time adhesive allows low viscosities to be maintained during the rolling process, so as to allow movement during rolling and avoid entrainment of air pockets. However, different requirements exist for capping insert leaks. A low initial viscosity, for example below about 10,000 cps, and preferably below about 1000 cps, is desirable to first achieve penetration of holes or defect, but such low viscosity materials can flow by gravity over time. For this reason, long cure times inhibit controlled application of a uniform and narrow bead of low viscosity fluid about the permeate tube. It is most desired that the resulting polymerized bead of reactive sealant cover less than 3% of the scroll area, and that the total mass of sealant material applied is less than 5 grams.

For the purposes of this specification, a two-part reactive material is understood to contain at least two different and separately stored monomers that are combined to induce polymerization. Known commercial two-part epoxies or urethanes include those with very short cure times, on the order of even one minute. However, components of a reactive, two-part sealant begin reacting upon mixing. This provides an additional practical limitation on the sealant material, in that components of the handling system that contact the reactive sealant (e.g. mixer, tubing, applicator) should not become rapidly clogged during normal operation. A typical handling system for a two-part reactive material will includes separate monomer reservoirs and pumps that feed a common static mixer and applicator. A preferred process would include a reactive sealant material that does not readily polymerize within the mixer, tubing or applicator, so that several minutes (at least 10 minutes) of inactivity between spiral wound modules could be accommodated if necessary, and excessive maintenance is avoided.

In a preferred embodiment, the time for a reactive sealant material to attain a viscosity of 200,000 centipoise is decreased by at least a factor of 4, more preferably at least a factor of 10, after its application to the module. In one embodiment, the reactive sealant material comprises an alkene monomer susceptible to free radical polymerization and a peroxide initiator. Exemplary peroxide initiators are described in the product bulletin, ("Peroxide Selection Guide for Molding Unsaturated Polyester Resins at Elevated Temperatures", QC1019-2(ATO-1241) 2C 8/00, Atofina Chemicals, Inc., Philadelphia, Pa.) which is incorporated by reference. Peroxides such as t-butyl peroxypivalate can have a half-life of many hours within a cooled handling system, but are activated by heat and exhibit a cure time of only a few minutes at a temperature of 80° C. For curing reactive material to prevent insertion-point leaks, we have found that heat may be applied directly to a region near the permeate tube, but that temperatures in excess of around 80° C. risk modifying tight dimensional tolerances for the tube.

In another preferred embodiment, the reactive sealant material is UV curable, containing at least one alkene monomer and a light sensitive photo initiator that induces free radical polymerization. A thin bead of reactive sealant material is applied about the permeate tube, in contact with a trimmed scroll end, and is then rapidly polymerized by application of light. Polymerization times may be less than one minute. Because polymerization does not take place within the applicator, long times between elements will not result in clogging of the handling system.

In a more preferred embodiment, the reactive sealant includes a cyanoacrylate and a light activated initiator. The cyanoacrylate monomer is most preferably methyl cyanoacrylate, ethyl cyanoacrylate, butyl cyanoacrylate, allyl cyanoacrylate, ethoxymethyl cyanoacrylate, or a similar molecule containing the cyanoacrylate group and an alkyl chain. Monomers within the reactive sealant material, including the cyanoacrylate monomer, are polymerized by free radical addition after exposure of the initiator to light, especially UV light. A particular advantage of cyanoacrylates is that, in addition to free radical polymerization, they additionally can undergo anionic polymerization in the presence of a weak base such as water. Therefore, small amounts of monomer in narrow pores may be polymerized, even if not directly exposed to light.

In one embodiment, a bead comprising an alkene monomer and an initiator is applied to the module as it is rotated about its central axis. While the element is rotating, a light is shined at the intersection of the permeate tube and scroll face to induce polymerization. In this way, even a low viscosity bead does not have sufficient time to run under gravity. Most preferably, the combined time for both application and curing, which may be done sequentially or simultaneously, takes less than 60 seconds or even 30 seconds. In one example, a solution (with viscosity of about 100 centipoise) containing ethyl cyanoacrylate and an initiator was applied while the element was rotated, so as to contact both the scroll face and permeate tube. It was simultaneously exposed to UV light and polymerized to a solid in about 15 seconds. A bead containing as much as 2.5 g of this low viscosity solution could be applied without dripping, and the resulting seal covered about 1.5% of the scroll surface area.

What is claimed is:

1. A method for fabricating a spiral wound module comprising:
   a. providing a generally rectangular membrane envelope comprising an open envelope edge and three envelope edges sealed with an adhesive that achieves a viscosity of at least 200,000 cps after at least 20 minutes from application;
   b. positioning the open envelope edge relative to a permeate collection tube having holes so that the open envelope edge is in fluid communication with a plurality of the holes;
   c. positioning a feed spacer sheet adjacent to the membrane envelope;
   d. winding the membrane envelope and adjacent feed spacer sheet about the permeate collection tube to form a wound membrane scroll having two spaced-apart scroll faces, each face being generally perpendicular to the permeate collection tube;
   e. applying a circumferential bead of reactive sealant material having an initial viscosity of less than about 10,000 cps to the module at location between the permeate collection tube and a scroll face; and
   f. curing the reactive sealant material to a viscosity of at least 200,000 cps in less than one minute.

2. The method of claim 1 wherein the reactive sealant material is heat curable and the step of curing comprises applying heat to the reactive sealant material.

3. The method of claim 2 wherein the reactive sealant material comprises a peroxide initiator.

4. The method of claim 2 wherein the reactive sealant material comprises a free radically polymerizable alkene monomer.

5. The method of claim 1 wherein the reactive sealant material is ultraviolet light curable and the step of curing comprises applying ultraviolet light to the reactive sealant material.

6. The method of claim 5 wherein the reactive sealant material comprises a cyanoacrylate.

7. The method of claim 6 wherein the cyanoacrylate is selected from at least one of: methyl cyanoacrylate, ethyl cyanoacrylate, butyl cyanoacrylate, allyl cyanoacrylate, and ethoxymethyl cyanoacrylate.

8. The method of claim 1 wherein the reactive sealant material has an initial viscosity of less than 1000 cps.

9. The method of claim 1 wherein the reactive sealant material has an initial viscosity of less than 100 cps.

10. The method of claim 1 wherein the step of applying a circumferential bead of reactive sealant material is performed while the module is rotated about a central axis.

11. The method of claim 1 wherein the step of curing the reactive sealant material is performed while the module is rotated about a central axis.

* * * * *